(12) United States Patent
Huentelman

(10) Patent No.: US 8,348,068 B2
(45) Date of Patent: Jan. 8, 2013

(54) CUTTING INSTRUMENT RACK

(76) Inventor: Mark Huentelman, Bellevue, WA (US)

( * ) Notice: Subject to any disclaimer, the term of this patent is extended or adjusted under 35 U.S.C. 154(b) by 289 days.

(21) Appl. No.: 12/726,574

(22) Filed: Mar. 18, 2010

(65) Prior Publication Data

US 2011/0226714 A1   Sep. 22, 2011

(51) Int. Cl.
*A47F 7/00* (2006.01)

(52) U.S. Cl. .................................................... 211/70.7

(58) Field of Classification Search ............ 211/70.7, 211/60.1, 70.6, DIG. 1, 85.29, 117; 248/37.3, 248/37.6; 30/138; D7/637, 638
See application file for complete search history.

(56) References Cited

U.S. PATENT DOCUMENTS

| | | | | |
|---|---|---|---|---|
| 1,614,342 A * | 1/1927 | Bleckley | ........................ | 211/70.6 |
| 1,701,062 A * | 2/1929 | Burnham | ........................ | 206/553 |
| 2,413,169 A * | 12/1946 | Case | ........................ | 451/555 |
| 2,839,349 A * | 6/1958 | Culver | ........................ | 312/323 |
| 2,845,323 A * | 7/1958 | Seibert, Jr. | ........................ | 312/244 |
| 2,953,255 A * | 9/1960 | Higgins | ........................ | 211/60.1 |
| 3,071,252 A * | 1/1963 | Hanschar | ........................ | 211/70.7 |
| 3,486,610 A * | 12/1969 | Warn, Sr. et al. | ........................ | 206/372 |
| 3,490,601 A * | 1/1970 | Warn, Sr. et al. | ........................ | 312/248 |
| 3,980,608 A * | 9/1976 | Faltersack | ........................ | 248/37.3 |
| 4,441,771 A * | 4/1984 | Roesler | ........................ | 312/322 |
| 4,511,040 A * | 4/1985 | Tolentino | ........................ | 206/553 |
| 4,561,548 A * | 12/1985 | Call | ........................ | 211/70.7 |
| 4,601,400 A * | 7/1986 | Buchanan et al. | ........................ | 211/70.7 |
| 4,807,764 A * | 2/1989 | Bellin | ........................ | 211/94.01 |
| 4,966,339 A * | 10/1990 | Lu | ........................ | 248/37.3 |
| 4,967,914 A * | 11/1990 | Keeton | ........................ | 211/70.7 |
| 5,050,749 A * | 9/1991 | Scaglione | ........................ | 211/70.7 |
| 5,244,272 A * | 9/1993 | Thompson | ........................ | 312/334.23 |
| 5,494,176 A * | 2/1996 | Zallo | ........................ | 211/70.7 |
| 5,725,108 A * | 3/1998 | Olson | ........................ | 211/70.7 |
| 5,957,558 A * | 9/1999 | Quade | ........................ | 312/323 |
| 5,964,359 A * | 10/1999 | Marino, Jr. | ........................ | 211/74 |
| 6,058,609 A * | 5/2000 | Yen et al. | ........................ | 30/298.4 |
| 6,581,774 B1 * | 6/2003 | Galafassi et al. | ........................ | 206/553 |
| 6,659,406 B2 * | 12/2003 | Tsuchida | ........................ | 248/37.3 |
| 7,131,545 B1 * | 11/2006 | Grogan | ........................ | 211/85.29 |
| 7,802,688 B1 * | 9/2010 | Ruan | ........................ | 211/70.7 |
| 7,841,093 B1 * | 11/2010 | Brady et al. | ........................ | 30/408 |
| 2002/0175131 A1 * | 11/2002 | Johnson | ........................ | 211/70.7 |
| 2005/0241984 A1 * | 11/2005 | Mosko | ........................ | 206/553 |
| 2005/0258115 A1 * | 11/2005 | Smith et al. | ........................ | 211/70.7 |
| 2006/0113263 A1 * | 6/2006 | Kratochvil | ........................ | 211/85.29 |
| 2007/0278165 A1 * | 12/2007 | Ranieri | ........................ | 211/70.7 |
| 2008/0060205 A1 * | 3/2008 | Schmidt et al. | ........................ | 30/298.4 |
| 2009/0101607 A1 * | 4/2009 | Zeng | ........................ | 211/70.7 |
| 2009/0261049 A1 * | 10/2009 | McQuary et al. | ........................ | 211/70.7 |
| 2010/0117498 A1 * | 5/2010 | Leinmuller et al. | ........................ | 312/228.1 |
| 2011/0226714 A1 * | 9/2011 | Huentelman | ........................ | 211/70.7 |
| 2012/0091083 A1 * | 4/2012 | Kindley | ........................ | 211/70.7 |

* cited by examiner

*Primary Examiner* — Jennifer E. Novosad
(74) *Attorney, Agent, or Firm* — Christensen O'Connor Johnson Kindness PLLC

(57) ABSTRACT

A cutting instrument rack hangs below a cabinet and above a counter so as to clear the space for performing useful tasks while facilitating access to various cutting instruments, such as knives and scissors. The edge of each cutting instrument is oriented away from a resting surface so as to reduce or avoid the dulling of the edge. The cutting instrument rack can be mounted to accommodate right-handed individuals. The same cutting instrument rack can be mounted to accommodate left-handed individuals by rotating the cutting instrument rack 180 degrees prior to mounting.

7 Claims, 9 Drawing Sheets

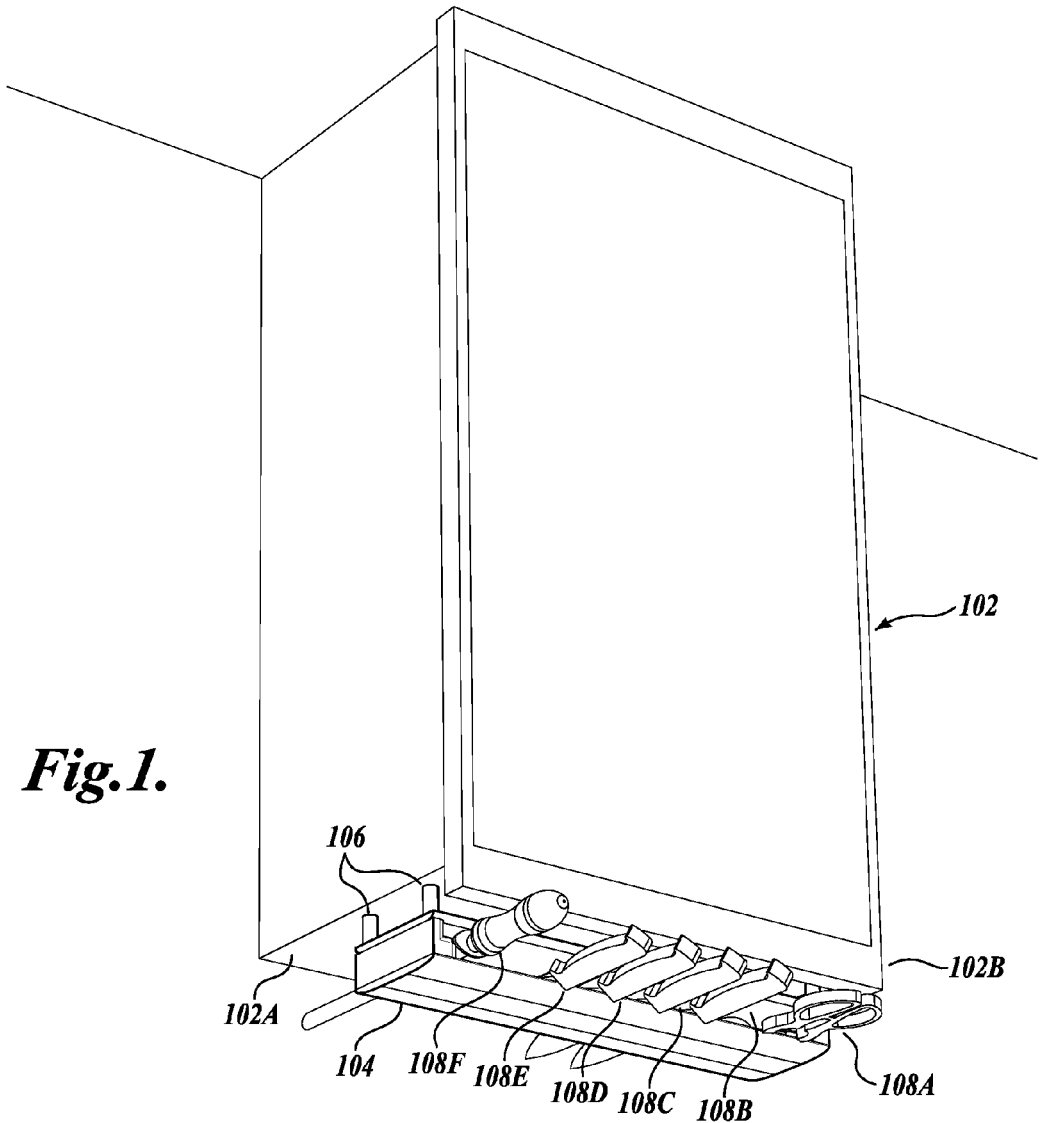
*Fig.1.*
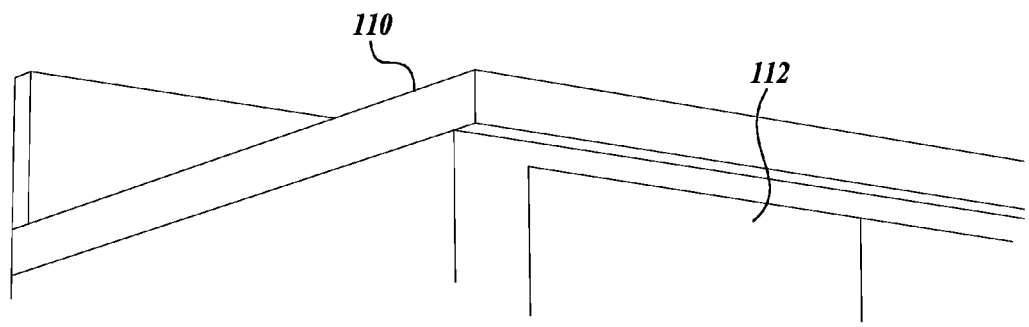

CUTTING INSTRUMENT RACK

BACKGROUND

Instruments like knives and scissors are useful cutting tools at work or at home, such as in a kitchen. They are stored in a manner that keeps them safe away from children while allowing easy access by adults. Knife blocks are a compact and usually solid piece of substantial wooden material with slits to receive knives and even scissors. Knife blocks typically take up counter space which limits the useful surface for kitchen tasks. If there is a spare wall, wall-mounted knife blocks may be used. However, aside from the awkward angle by which to grip handles of knives and scissors, their position threatens the safety of children. There are knife organizers that can be placed into drawers, but they limit useful storage for other kitchen items and do not allow for easy access.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a product form of the subject matter, which recites a cutting instrument rack that hangs below a cabinet. The cutting instrument rack includes a top on top of which a set of spacers separate the rack below the cabinet, a proximal side, an L-shaped distal side configured to have a terminal with embedded magnets, and a bottom on top of which a set of ribs is disposed. Each rib includes a posterior with embedded magnets, each posterior being oriented at an angle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a pictorial diagram illustrating an archetypical cutting instrument rack mounted below a kitchen cabinet;

DETAILED DESCRIPTION

Figure 2:
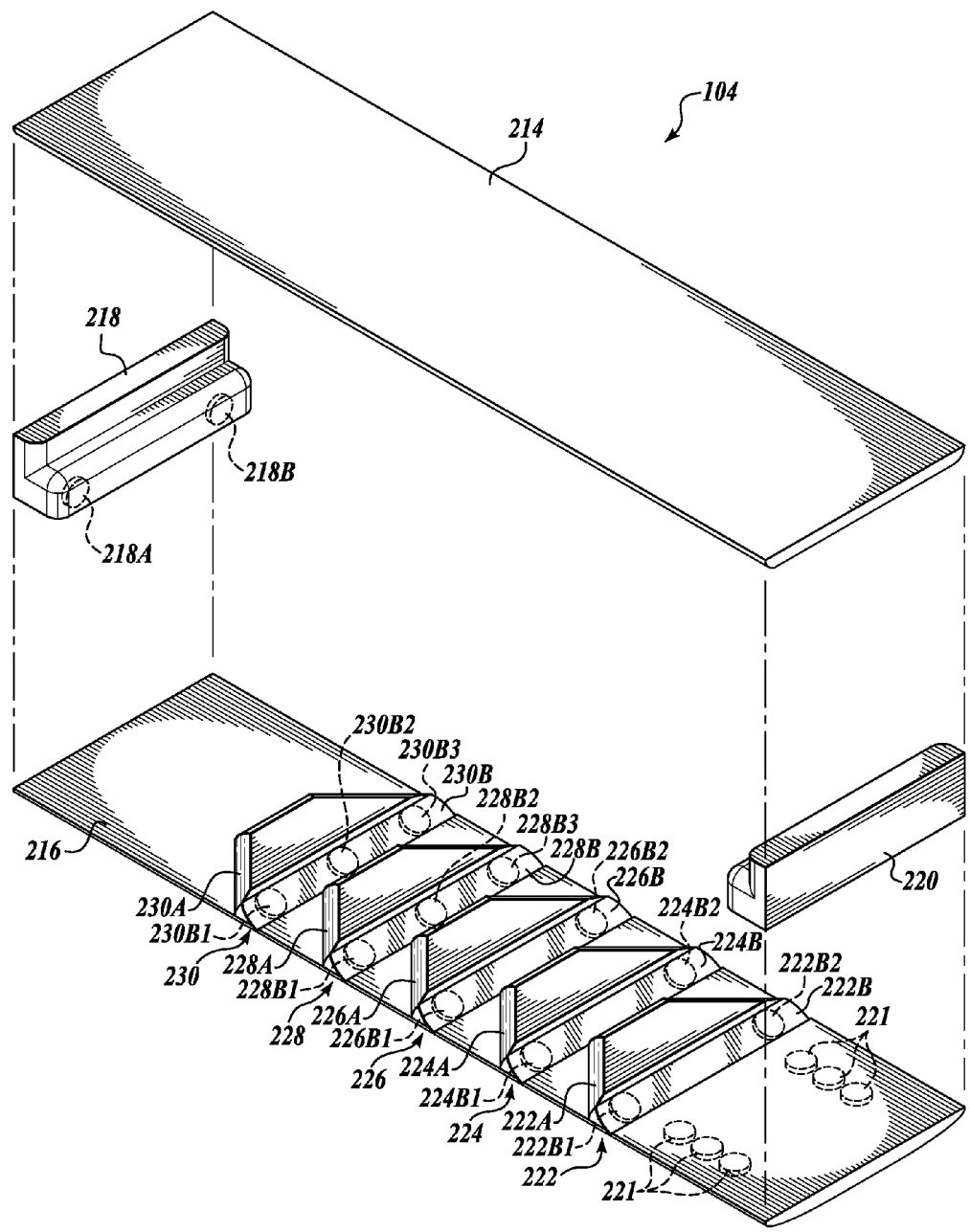
FIG. 2 is an exploded, isometric view of an archetypical cutting instrument rack in accordance with one embodiment of the present subject matter.

Various embodiments of the present subject matter describe a cutting instrument rack, suitably manufactured from wood or plastic, which hangs below an upper cabinet and above a counter so as to clear the space for performing useful tasks while facilitating access to various cutting instruments, such as knives and scissors. In one or more embodiments of the present subject matter, the edge of each cutting instrument is oriented away from a resting surface so as to reduce or avoid the dulling of the edge. In one embodiment of the present subject matter, the cutting instrument rack can be mounted to accommodate right-handed individuals. In the same embodiment, the cutting instrument rack can be mounted to accommodate left-handed individuals by rotating the cutting instrument rack 180 degrees prior to mounting.

FIG. 1 illustrates a space at work or at home, such as a kitchen. The kitchen includes kitchen cabinets 102, 112, which are cupboards with drawers or shelves for use to store items in a kitchen. Mounted below a bottom 102a of the kitchen cabinet 102 is a cutting instrument rack 104 in accordance with one embodiment of the present subject matter. The kitchen cabinet 102 includes a facing 102b that may extend beyond the bottom 102a of the kitchen cabinet 102. Suitably, the cutting instrument rack 104 is mounted well below the facing 102b via the use of spacers 106 while providing sufficient vertical clearance from a counter 110, which is situated on top of the kitchen cabinet 112. Cutting instruments, such as a pair of kitchen scissors 108a, butcher knives 108b, 108c, a poultry knife 108d, a paring knife 108e, and, typically, a sharpener 108f, are also shown.

FIG. 2 illustrates the cutting instrument rack 104 in greater detail. The cutting instrument rack 104 includes a top 214, which covers the cutting instruments 108a-108f secured to the bottom 102a of the kitchen cabinet 102. Two L-shaped sides 218, 220 couple the top 214 to a bottom 216 of the cutting instrument rack 104. The proximal side 220 is suitably located near where the kitchen scissors 108a rest. This end of the cutting instrument rack 104 includes a number of embedded magnets 221. These embedded magnets 221 fasten the kitchen scissors 108a to the bottom 216. The distal side 218 is suitably oriented near the resting location of the sharpener 108f. Two magnets 218a, 218b are embedded in a terminal of the L-shaped side 218 to fasten the sharpener 108f to the terminal of the L-shaped side 218.

Between the L-shaped sides 218, 220 are a number of ribs 222, 224, 226, 228, and 230, all of which are disposed on top of the bottom 216 of the cutting instrument rack 104. Each rib 222-230 is configured to have a quadrilateral body 222a, 224a, 226a, 228a, and 230a, which terminates with a posterior surface 222b, 224b, 226b, 228b, and 230b. Each quadrilateral body 222a-230a is shaped so that its edges are smoothed to facilitate ingress and egress of cutting instruments. Each posterior is set at an angle to attract cutting instruments to the posterior so that the edge of their blade is oriented up and away from the bottom 216. The quadrilateral body of each rib has an anterior, which terminates at the posterior of a succeeding rib. For example, the anterior of the quadrilateral body 222a of the rib 222 terminates at the posterior 224b of the quadrilateral body 224a of the rib 224. The anterior of the quadrilateral body 224a of the rib 224 terminates at the posterior 226b of the quadrilateral body 226a of the rib 226. The anterior of the quadrilateral body 226a of the rib 226 terminates at the posterior 228b of the quadrilateral body 228a of the rib 228. The anterior of the quadrilateral body 228a terminates at the posterior 230b of the quadrilateral body 230a of the rib 230. Each posterior of the ribs 222-230 terminates in a notch 222c-230c. The notches define an L-shaped void that spans the width of the bottom 216 to receive and align the back of the cutting instruments 108b-108e.

Each posterior of the various quadrilateral bodies 222a-230a has two or more magnets embedded in it to fasten a cutting instrument, such as butcher knives 108b, 108c; a poultry knife 108d; and a paring knife 108e. The posterior 222b includes two embedded magnets 222b1, 222b2 to fasten the butcher knife 108b. The posterior 224b has embedded magnets 224b1, 224b2 to fasten the butcher knife 108c. The posterior 226b has two embedded magnets 226b1, 226b2. The posterior 228b includes three embedded magnets 228b1, 228b2, and 228b3 to fasten a poultry knife 108d to the posterior 228b. The posterior 230b includes three embedded magnets 230b1, 230b2, and 230b3 to fasten a paring knife to two of the magnets to the posterior 230b.

Figure 3:
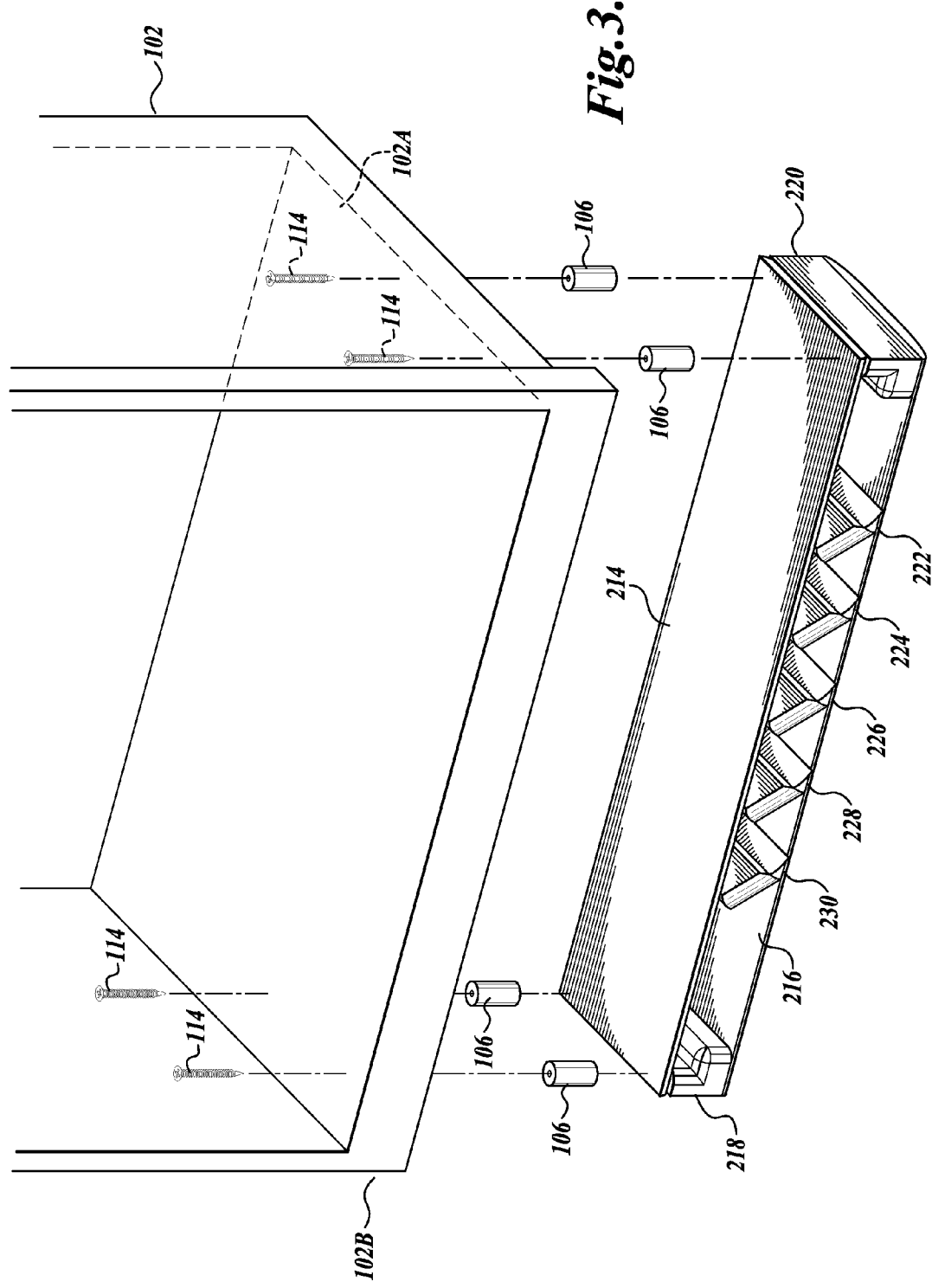
FIG. 3 is an assembled, isometric view of the cutting instrument rack in accordance with one embodiment of the present subject matter.

FIG. 3 shows a suitable mounting of the cutting instrument rack 214 to the bottom 102a of the kitchen cabinet 102. Depending on the facing 102b, suitable length spacers 106 are placed on the top 214. Screws 114 are drilled through the bottom 102a, through the holes in the spacers 106 and the top 114, and terminate in the terminals of the L-shaped sides 218, 220 to secure the cutting instrument rack 214 to the bottom 102a of the kitchen cabinet 102.

Figure 4:
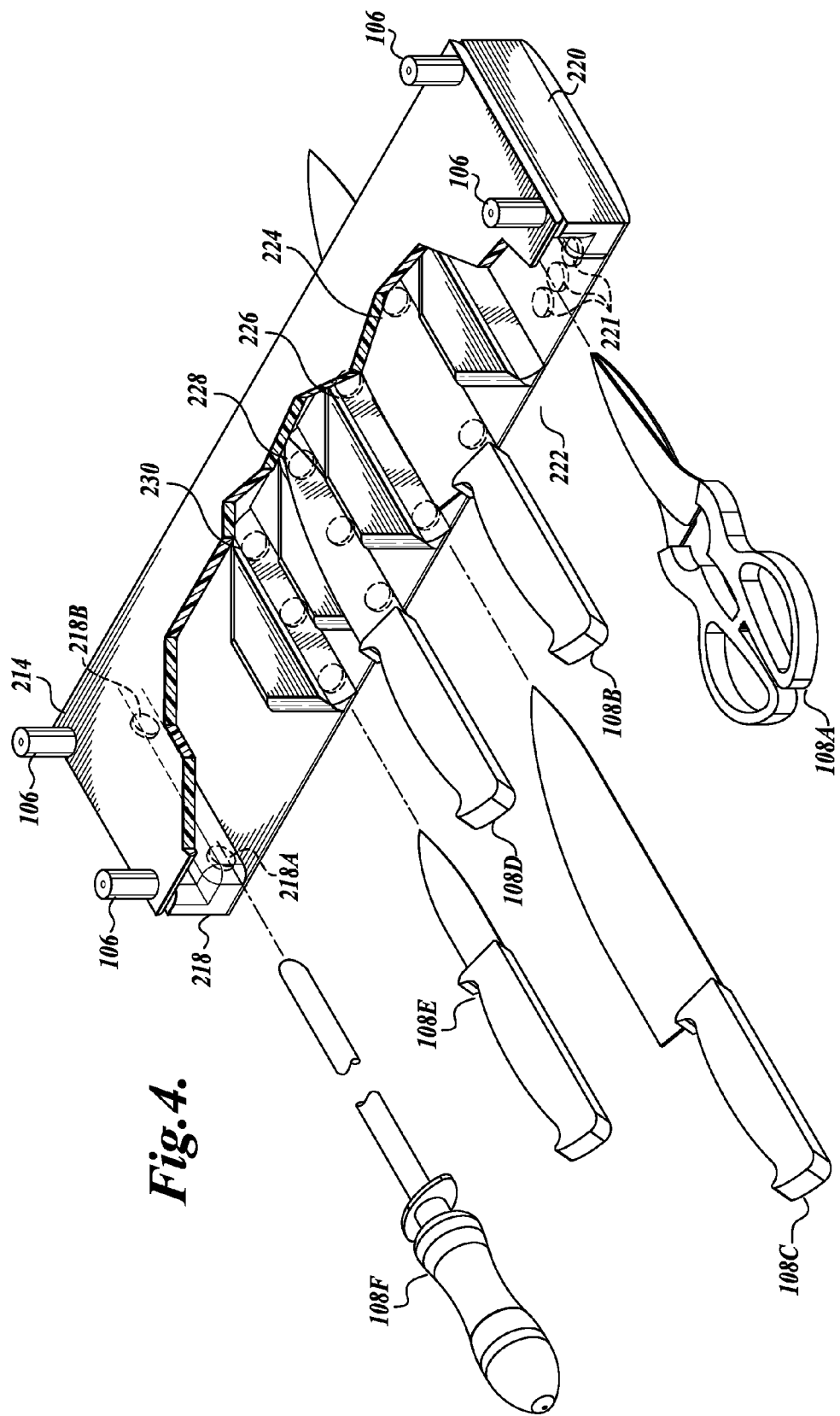
FIG. 4 is an assembled, cutaway, isometric view of the cutting instrument rack in accordance with one embodiment of the present subject matter.
Figure 5:
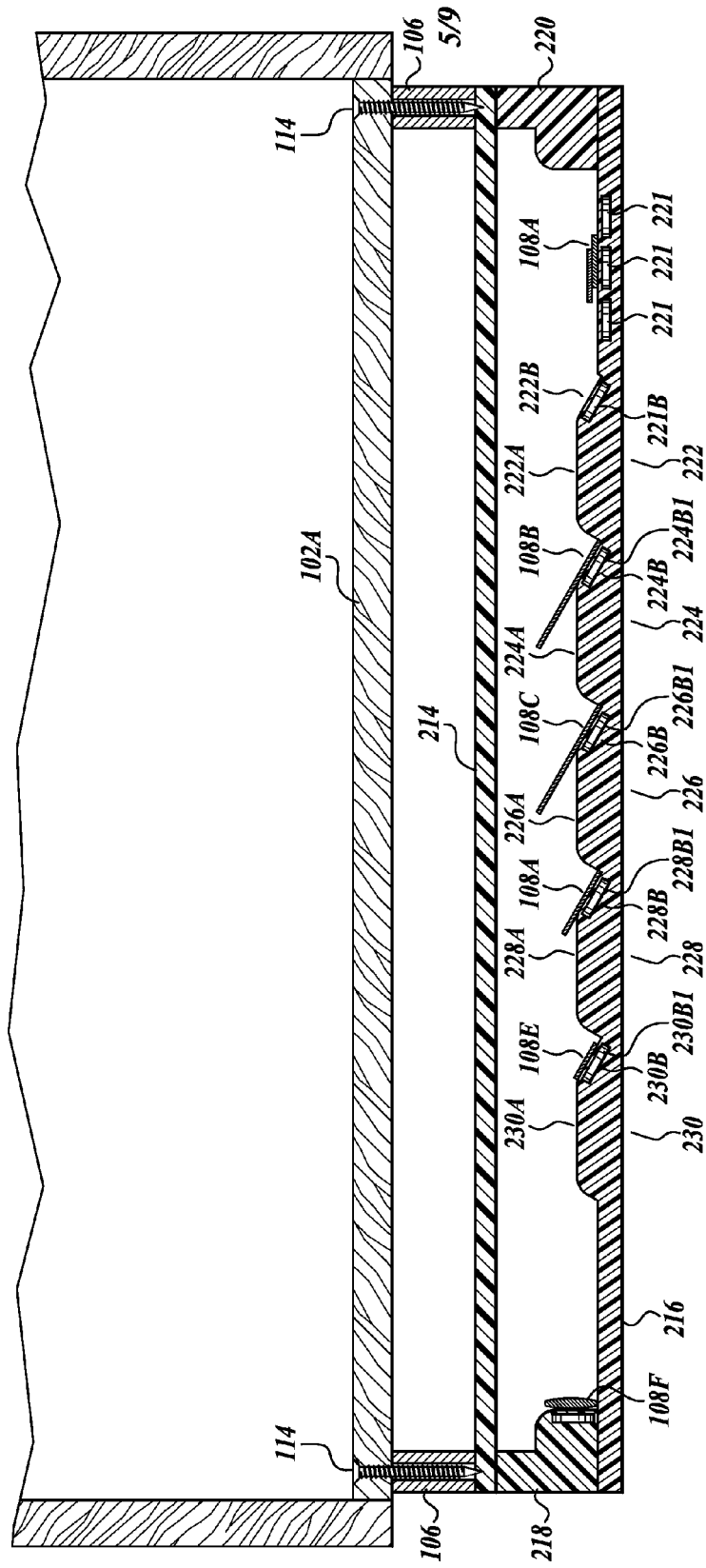
FIG. 5 is a front view of the cutting instrument rack in accordance with one embodiment of the present subject matter.

FIG. 4 illustrates archetypical placement of various cutting instruments, such as the placement of the kitchen scissors 108a into the cutting instrument rack 104, which is held by the magnets 221. The butcher knife 108b rests on the posterior of the rib 224. The butcher knife 108c rests on the posterior of the rib 226. The poultry knife 108d rests on the posterior of the rib 228. The paring knife 108e rests on the posterior of the rib 230. The sharpener 108f rests near the embedded magnets 218a, 218b of the proximal L-shaped side 218. FIG. 5 illustrates in front details the fastening of the cutting instrument rack 104 to the bottom 102a of the kitchen cabinet 102.

Figure 6:
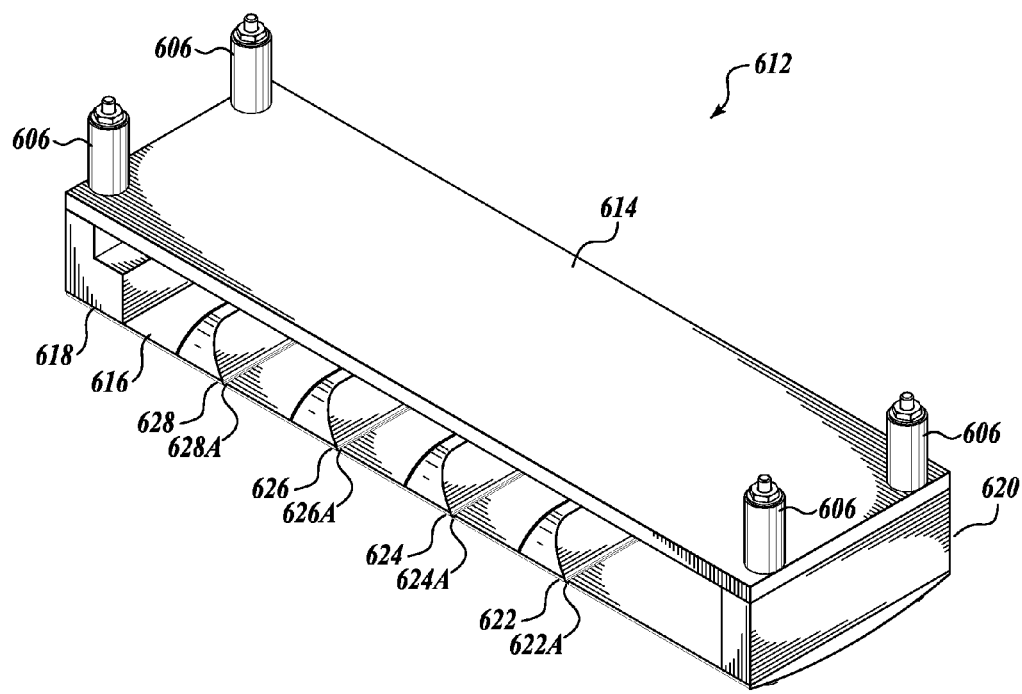
FIG. 6 is an assembled, isometric view of an archetypical cutting instrument rack in accordance with another embodiment of the present subject matter.

FIG. 6 illustrates a second embodiment of a cutting instrument rack 612. The cutting instrument rack 612 includes a top 614, which is coupled to a bottom 616 via sides 618, 620. A number of ribs 622, 624, 626, and 628 are spaced apart and formed on top of the bottom 616. Each rib 622-628 is shaped so that its edges are smoothed to facilitate ingress and egress of cutting instruments. Each posterior of the ribs 622-628 terminates in a notch 622a, 624a, 626a, and 628a. Embedded magnets are provided underneath the posteriors of the ribs 622-628 to fasten knives to the surface of the posteriors. The notches 622a-628a define a U-shaped void that spans the width of the bottom 616 to receive and align a back of a blade of the cutting instruments 108b-108e. Mounted on the top 614 are spacers 606 that separate the cutting instrument rack 612 by a suitable distance from the bottom 102a of the kitchen cabinet 102.

Figure 7:
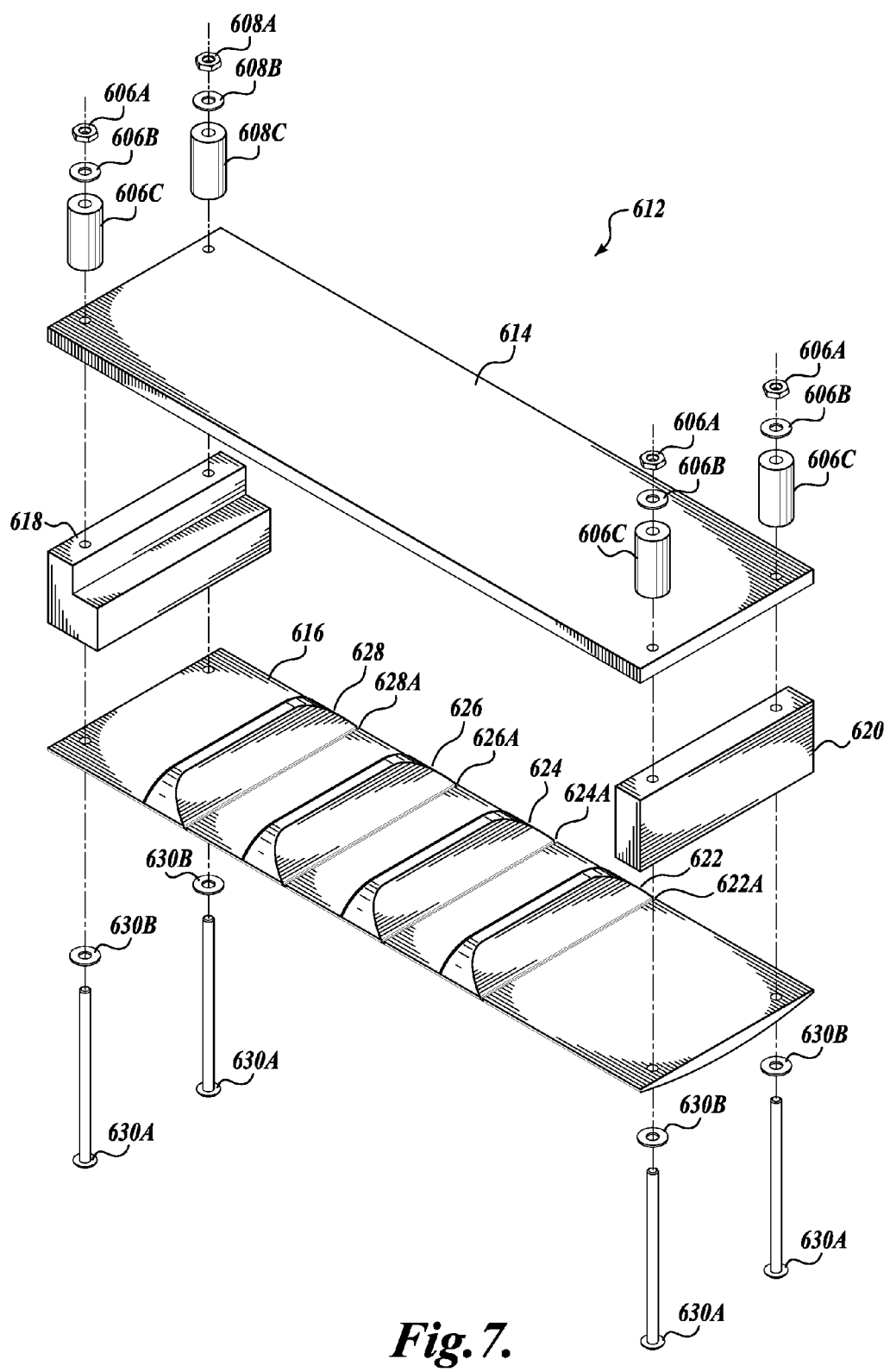
FIG. 7 is an exploded, isometric view of the cutting instrument rack in accordance with one embodiment of the present subject matter.

FIG. 7 illustrates the assembly of the cutting instrument rack 612. A quartet of rivets 630a are each a headed pin or bolt of metal or plastic for uniting the pieces of the cutting instrument rack 612 by passing the annular openings of washers 630b through the holes of the bottom 616 and the sides 618, 620, continuing through the top 614, the spacers 606c, the cabinet bottom 102a, and washers 606b, and threading with nuts 606a to secure the pieces of the cutting instrument rack 612 together and to the cabinet 102. Each posterior is set at an angle to attract cutting instruments to the posterior so that the edges of their blades are oriented up and away from the bottom 616. Suitably, the posterior has a surface area that is less than the area of the blade of the cutting instruments. The anterior of each rib suitably terminates in a 90 degree angle.

Figure 8:
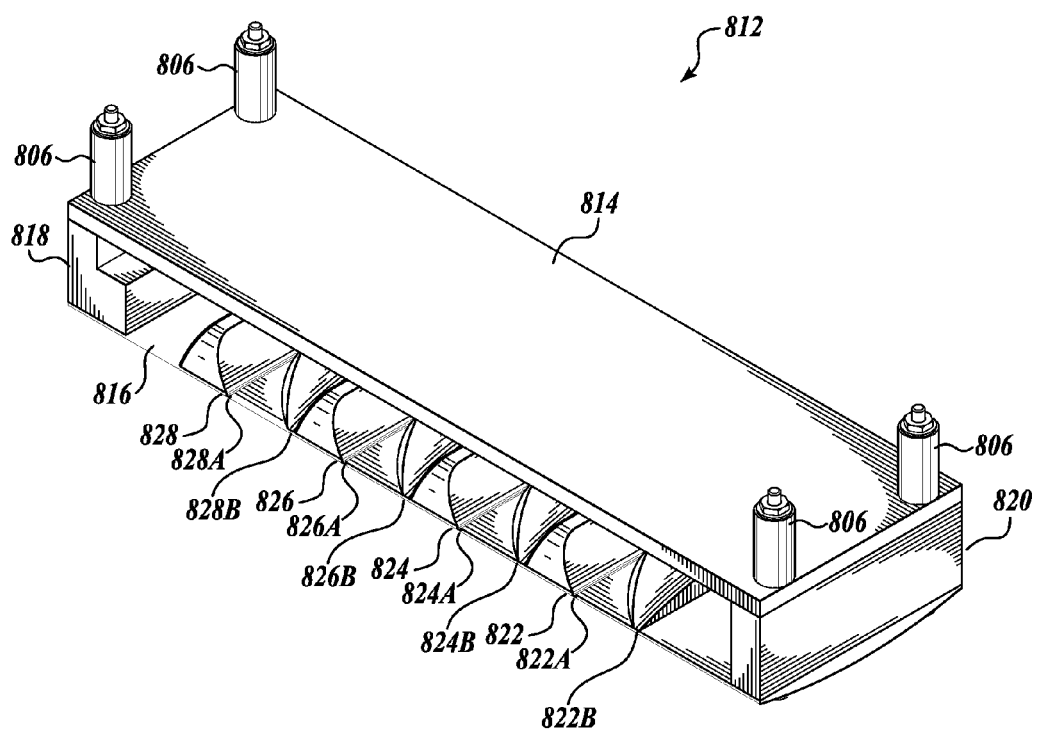
FIG. 8 is an assembled, isometric view of an archetypical cutting instrument rack in accordance with a further embodiment of the present subject matter.

FIG. 8 illustrates a third embodiment of a cutting instrument rack 812 in accordance with the present subject matter. The cutting instrument rack 812 includes a top 814. Spacers 806 suitably separate the cutting instrument rack 812 from the bottom 102a of the kitchen cabinet 102 so as to avoid the facing 102b. Spacers 818, 820 couple the top 814 to a bottom 816 of the cutting instrument rack 812. A number of ribs 822, 824, 826, and 828 have posteriors with embedded magnets to fasten blades of the cutting instruments 108b-108e. Each rib 822-828 is shaped so that its edges are smoothed to facilitate ingress and egress of cutting instruments. U-shaped notches 822a, 824a, 826a, and 828a terminate the posterior of each rib while spanning the width of the bottom 816. A wedge 822b, 824b, 826b, and 828b is situated within proximity to the U-shaped notches for guiding the back of the blade of each cutting instrument 108b-108e to rest in the U-shaped notches 822a-828a.

Figure 9:
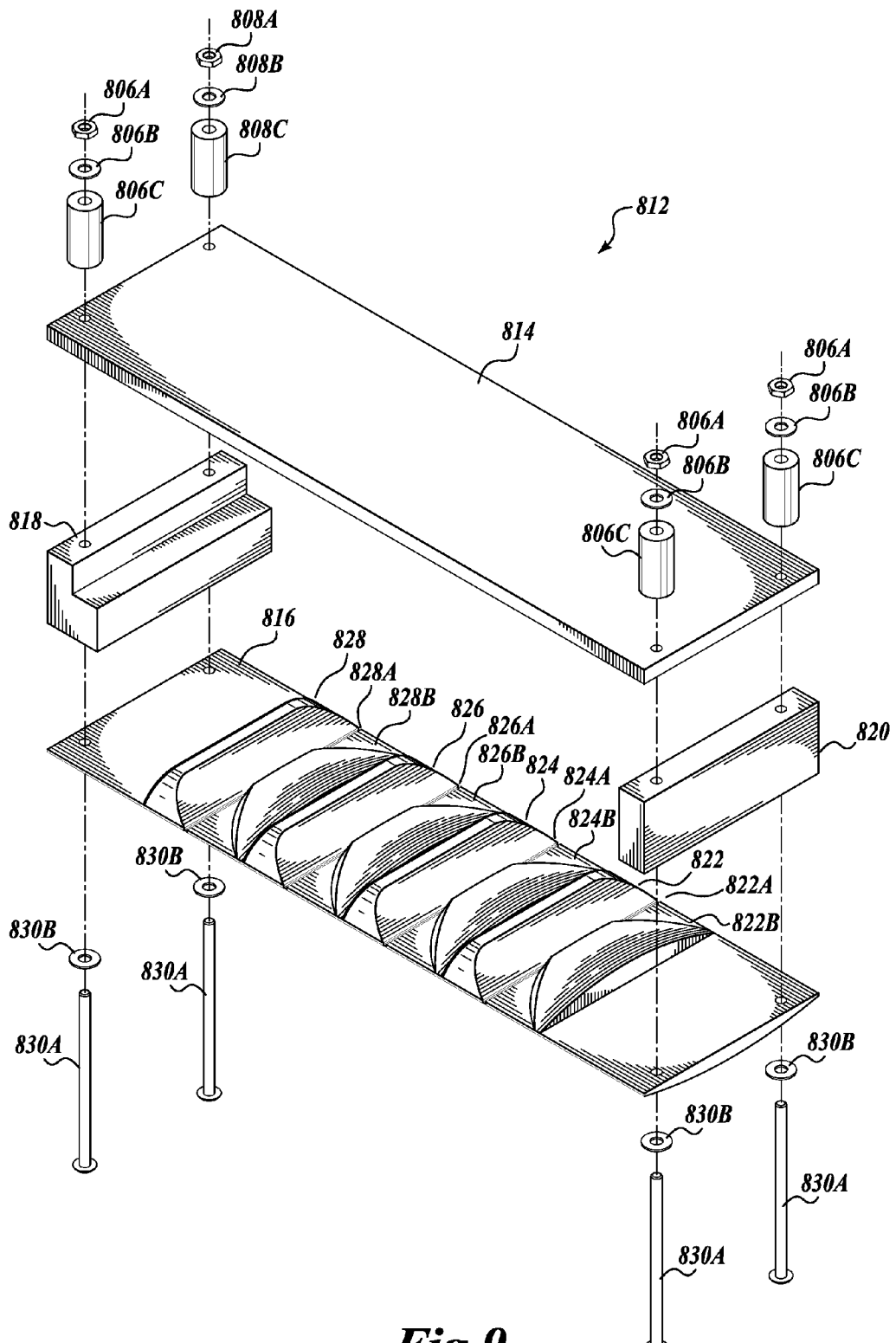
FIG. 9 is an exploded, isometric view of the cutting instrument rack in accordance with one embodiment of the present subject matter.

FIG. 9 shows a set of rivets 830a, which are headed pins or bolts of metal or plastic used for uniting the pieces of the cutting instrument rack 812 by passing the shank of the rivets 830a through the annular voids defined by washers 830b, holes at the bottom 816, the sides 818, 820, and the top 814. The shank of the rivets 830a continues through spacers 806c, the cabinet bottom 102a, washers 806b, and terminates by securing to nuts 806a. Each posterior is set at an angle to attract cutting instruments to the posterior so that the edges of their blades are oriented up and away from the bottom 816. Suitably, the posterior has a surface area that is less than the area of the blade of the cutting instruments. The anterior of each rib suitably terminates in a 90 degree angle.

While illustrative embodiments have been illustrated and described, it will be appreciated that various changes can be made therein without departing from the spirit and scope of the invention.

The embodiments of the invention in which an exclusive property or privilege is claimed are defined as follows:

1. A cutting instrument rack that is adapted to hang below a cabinet, comprising:
   a top on top of which a set of spacers is adapted to separate the rack below the cabinet;
   a proximal side;
   an L-shaped distal side configured to have a terminal with embedded magnets; and
   a bottom, which is not angled, on top of which a set of ribs is disposed, each rib including a posterior with embedded magnets, each posterior being oriented at an angle;
   wherein embedded into the bottom are a number of magnets to fasten a pair of scissors.

2. The cutting instrument rack of claim 1, wherein each rib is configured to have a body including an anterior and the posterior, the anterior terminating at the posterior of a succeeding rib.

3. The cutting instrument rack of claim 1, wherein each rib is spaced apart from another rib and is configured to have a body including an anterior and the posterior, the posterior being terminated in a notch defining a void that spans the width of the bottom.

4. The cutting instrument rack of claim 1, wherein each rib is spaced apart from another rib and is configured to have a body including an anterior and the posterior, the posterior being terminated in a notch defining a void that spans the width of the bottom, a wedge being situated within proximity to the void.

5. The cutting instrument rack of claim 1, further comprising a set of rivets whose shanks unite the top, the proximal side, the L-shaped distal side, and the bottom through holes in each, and which terminate by securing to a cabinet with a set of nuts.

6. The cutting instrument rack of claim 1, further comprising screws that thread through the spacers mounted on the top to secure the rack.

7. A cutting instrument rack that is adapted to hang below a cabinet, comprising:
   a top on top of which a set of spacers is adapted to separate the rack below the cabinet;
   a proximal side;
   an L-shaped distal side configured to have a terminal with embedded magnets; and
   a bottom, which is not angled, on top of which a set of ribs is disposed, each rib including a posterior with embedded magnets, each posterior being oriented at an angle;
   further comprising a set of rivets whose shanks unite the top, the proximal side, the L-shaped distal side, and the bottom through holes in each, and which terminate by securing to a cabinet with a set of nuts.

* * * * *